Sept. 5, 1967  H. L. CROSWHITE ET AL  3,339,431
MULTIPLE SPEED RATIO POWER TRANSMISSION SYSTEM
WITH OVERDRIVE GEARING
Filed Oct. 14, 1965  9 Sheets-Sheet 2

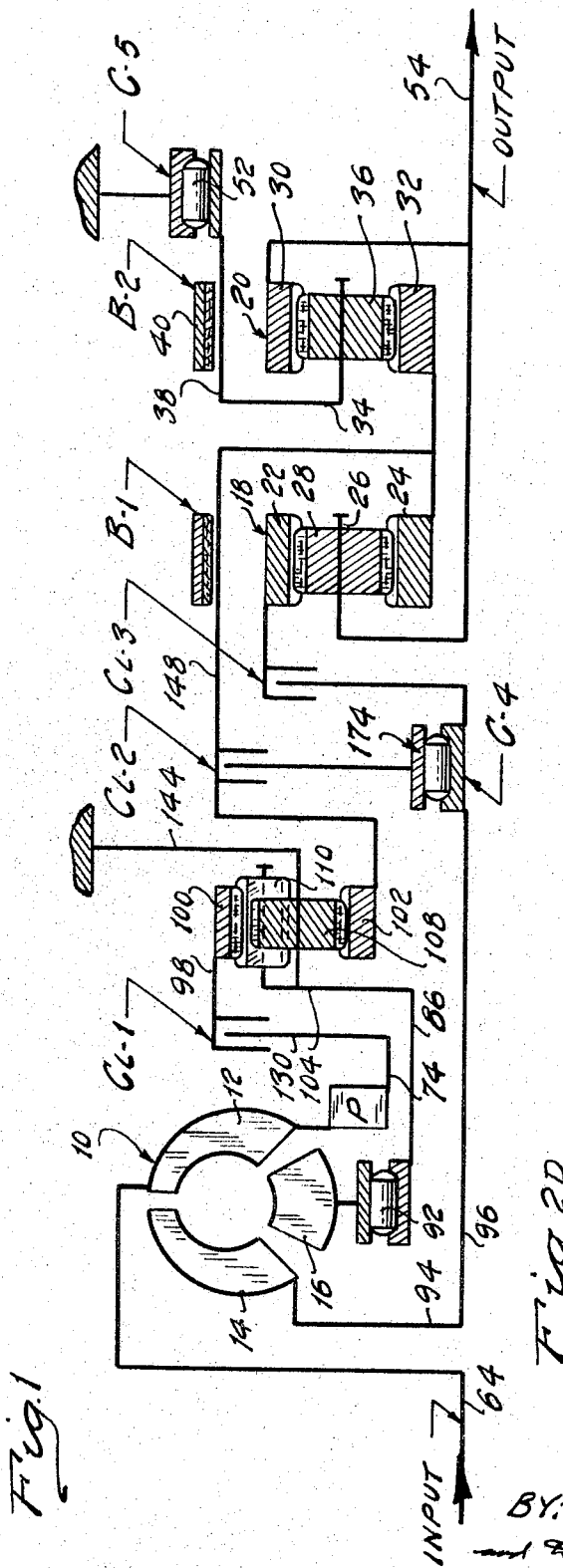

INVENTORS:
RICHARD L. LEONARD
HOWARD L. CROSWHITE
BY
ATTORNEYS.

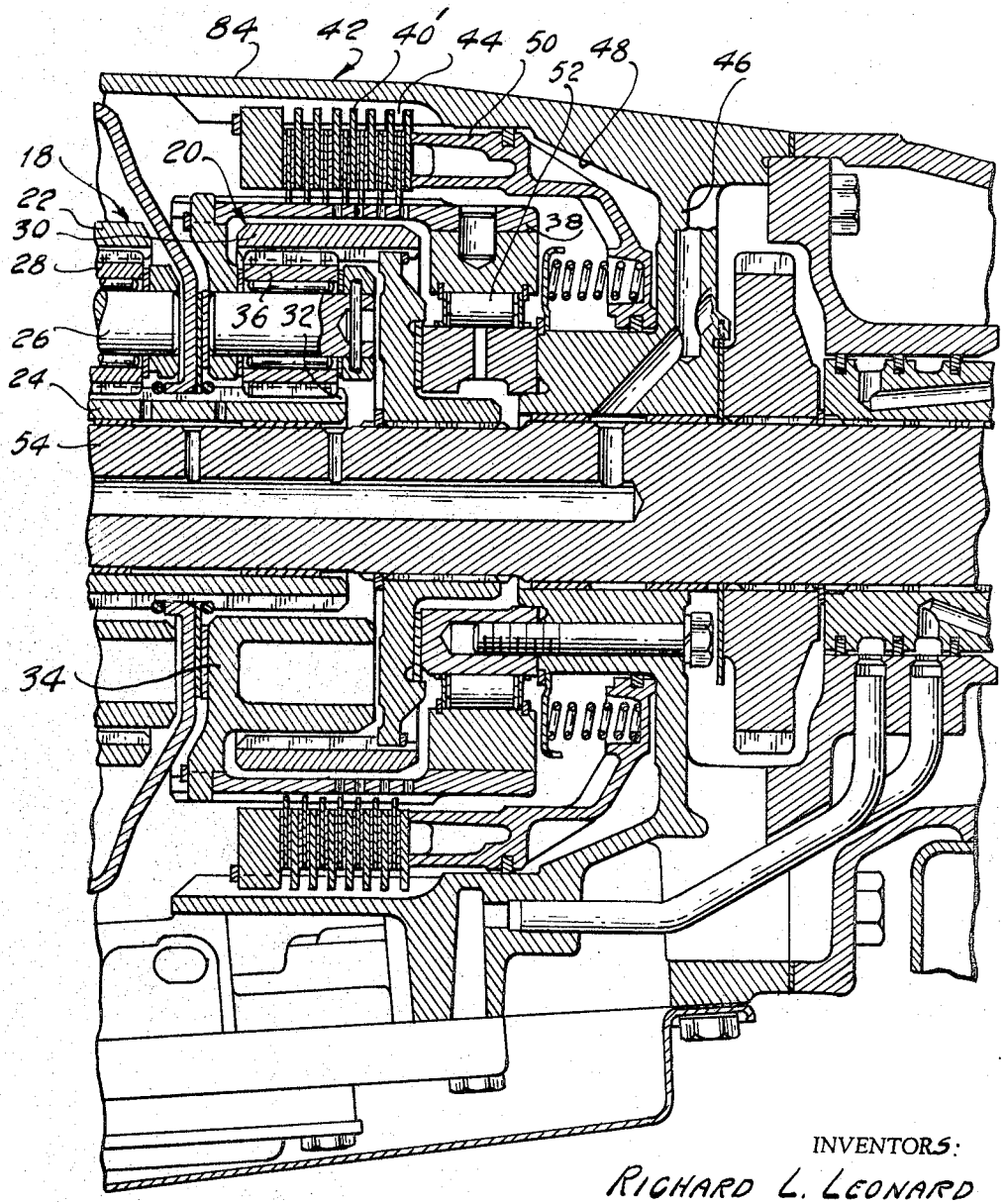

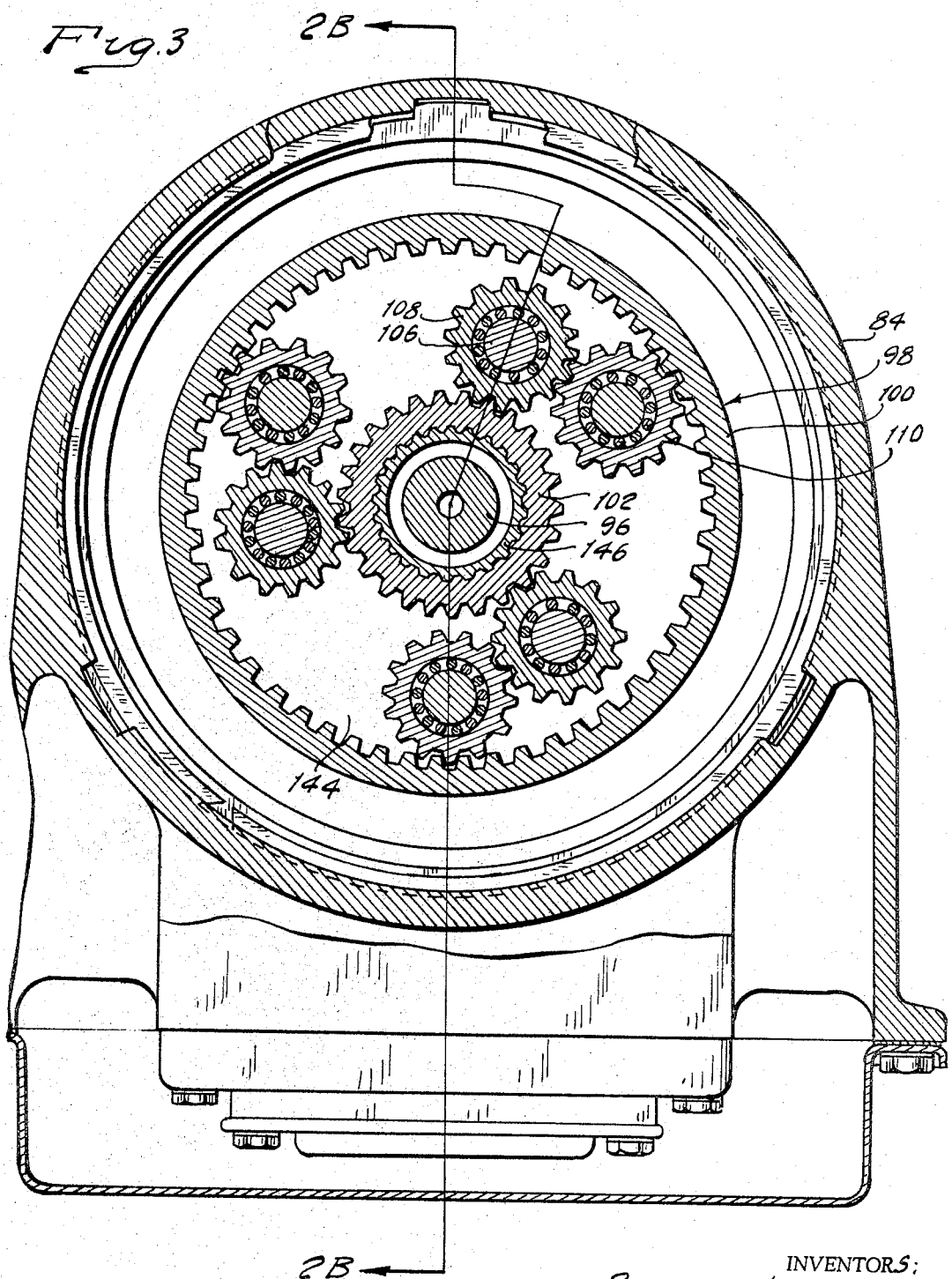

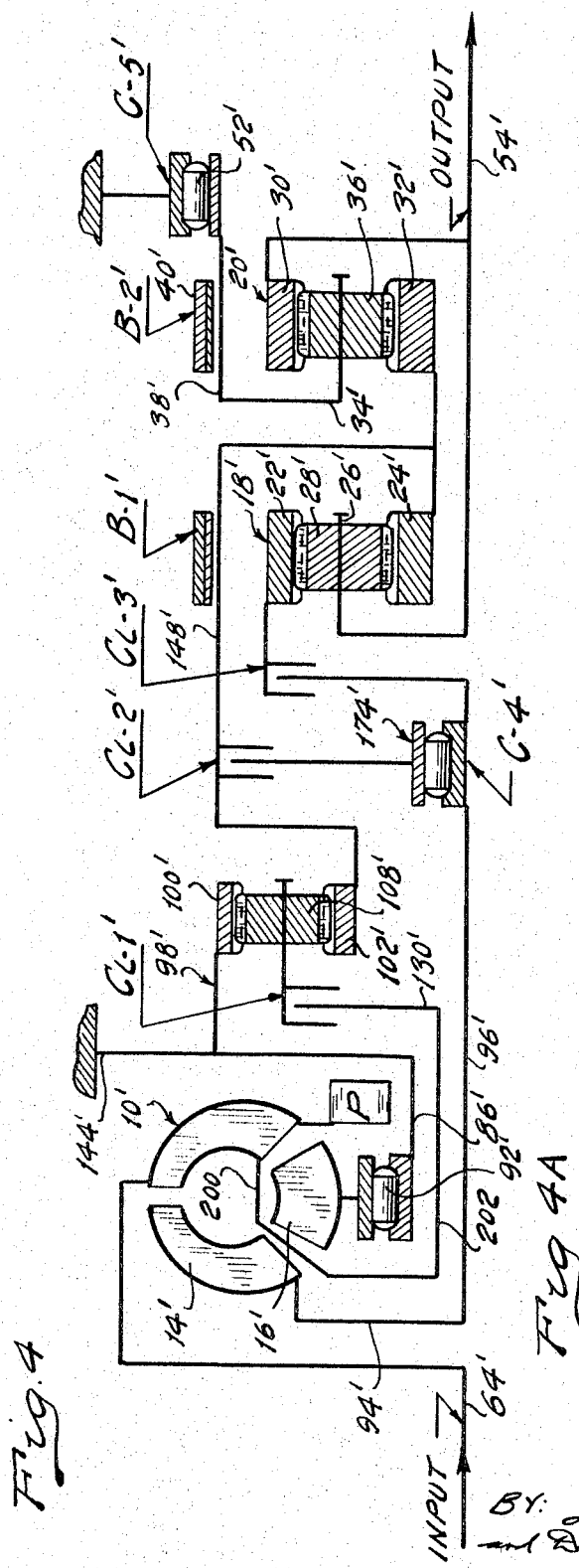

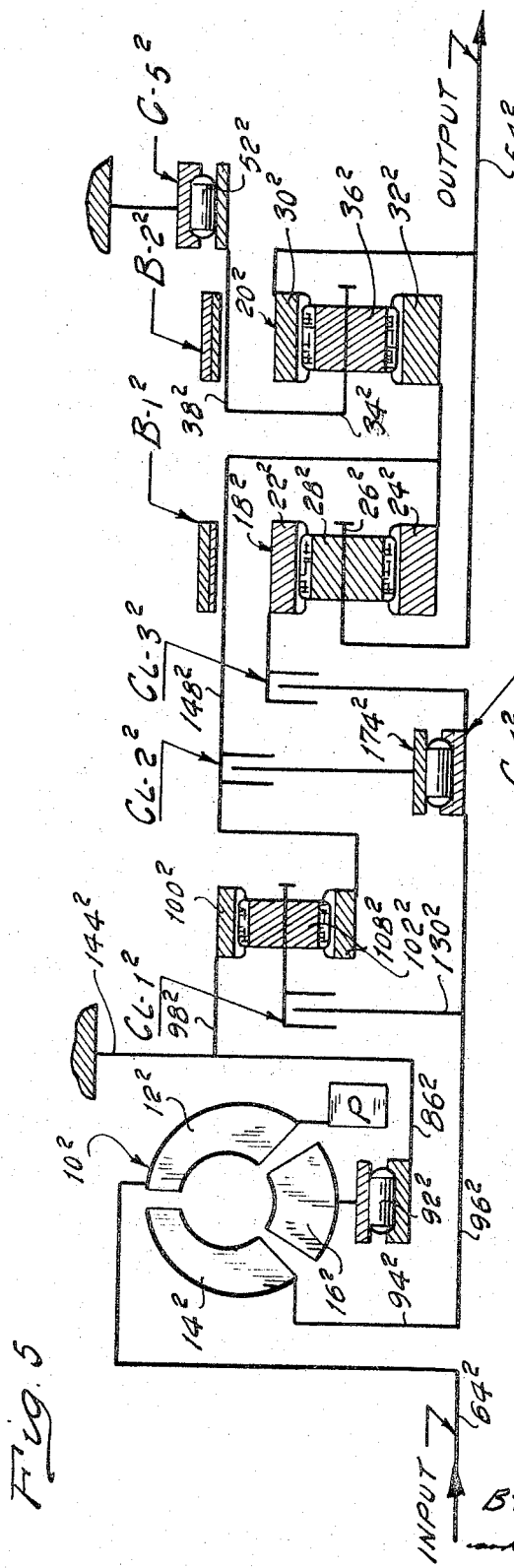

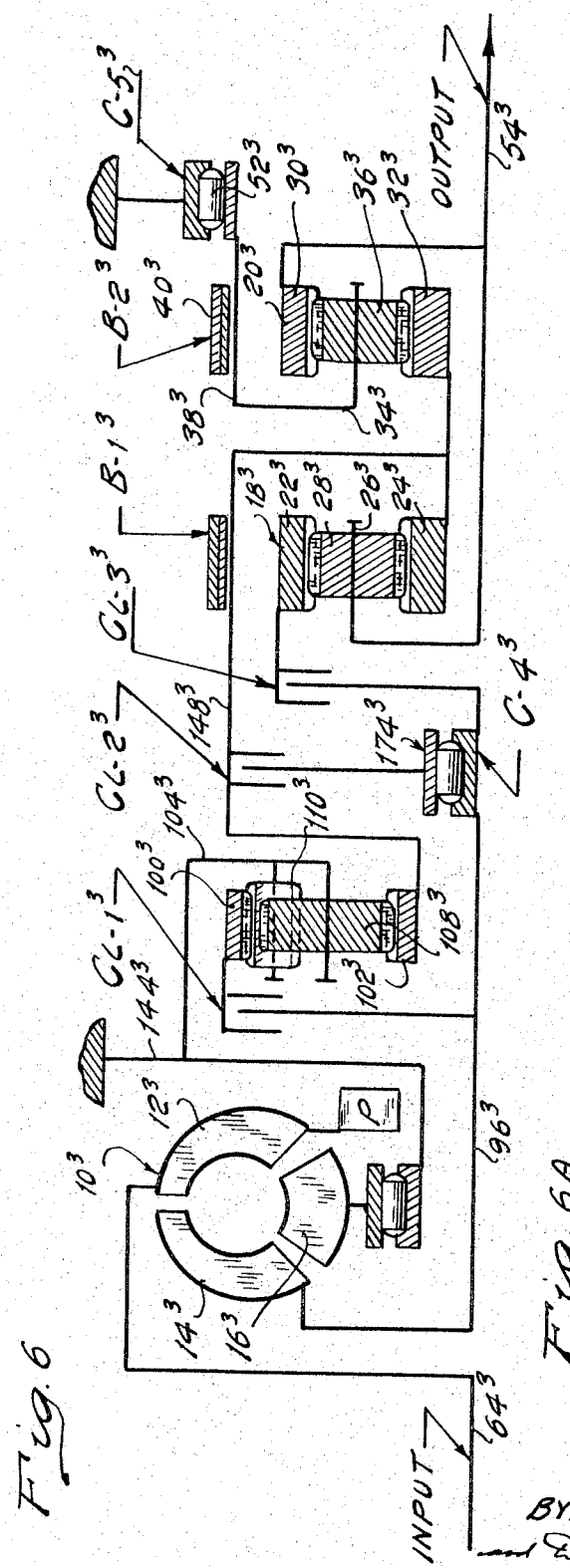

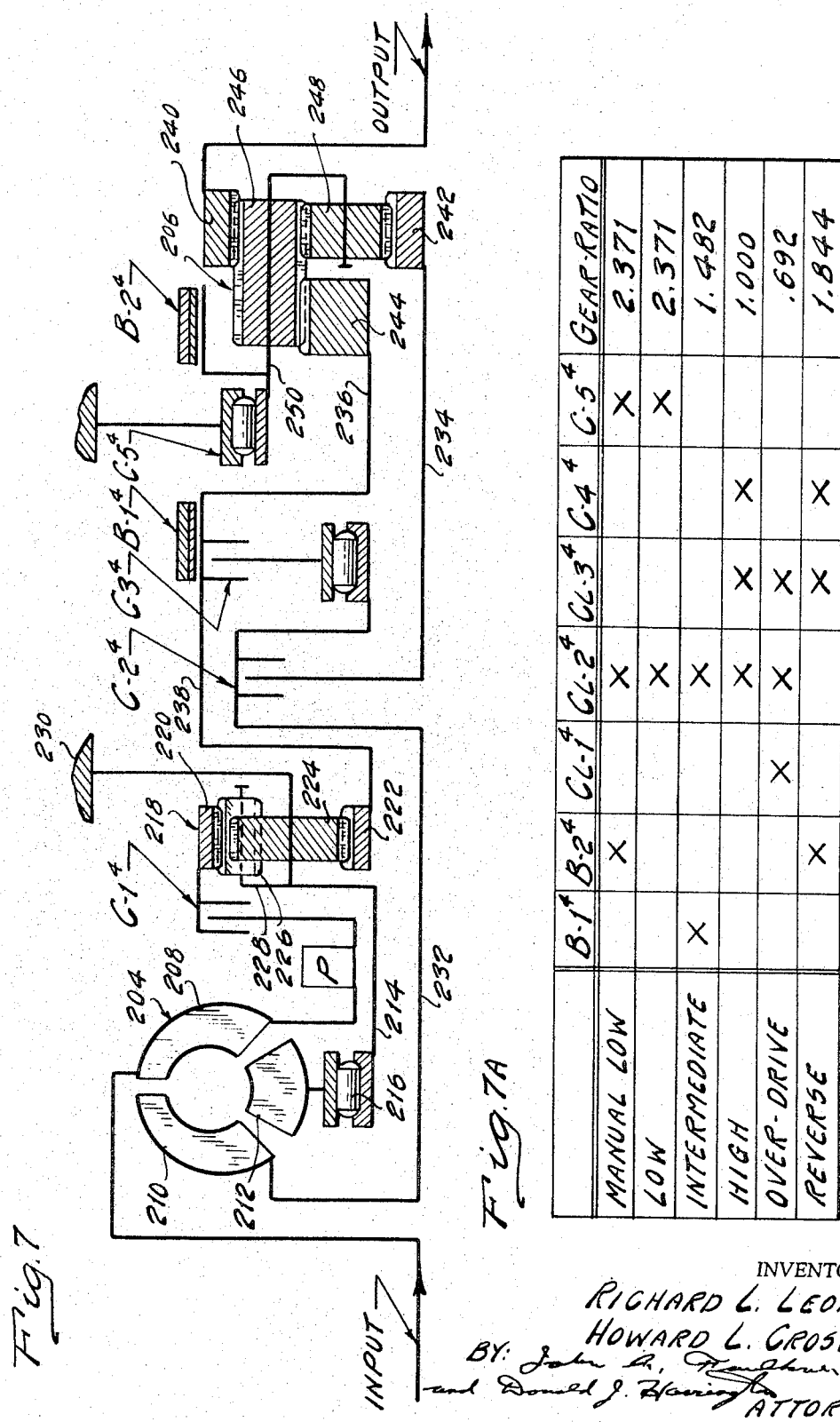

United States Patent Office 3,339,431
Patented Sept. 5, 1967

3,339,431
MULTIPLE SPEED RATIO POWER TRANSMISSION SYSTEM WITH OVERDRIVE GEARING
Howard L. Croswhite, Livonia, and Richard L. Leonard, Farmington, Mich., assignors to Ford Motor Company, Dearborn, Mich., a corporation of Delaware
Filed Oct. 14, 1965, Ser. No. 495,879
12 Claims. (Cl. 74—688)

Our invention relates generally to multiple speed ratio planetary gearing capable of establishing plural torque delivery paths between a driving member and a driven member wherein one of the torque delivery paths has an overdrive speed ratio. More particularly, our invention relates to a power transmission system for an automotive vehicle driveline having multiple forward driving speed ratios, including an overdrive wherein a hydrokinetic torque converter is used in at least some of the ratios to define a hydrokinetic torque delivery path. In a preferred form of our invention the overdrive characteristic is obtained by means of a planetary gear arrangement situated between the hydrokinetic torque converter and an assembly of two simple planetary gear units.

It is an object of our invention to provide a planetary gear system of the type above set forth wherein the overdrive gearing can be rendered either functional or nonfunctional to provide an additional overdrive ratio in a transmission system that normally is capable of producing multiple underdrive ratios and a direct drive ratio in a forward driving direction.

It is a further object of our invention to provide a planetary gear system of the type above set forth wherein a portion of the driving torque delivered by the vehicle engine is distributed mechanically to the elements of the planetary gearing while the balance of the torque is distributed hydrokinetically through the torque converter mechanism thereby providing a split torque delivery path from the engine to the gearing.

It is a further object of our invention to provide an overdrive power transmission system of the type above set forth wherein a nonsynchronous pickup shift from a so-called direct drive, high speed ratio to the overdrive ratio can be obtained by engaging selectively a single friction clutch. Sequential timing of the operation of two friction torque establishing devices in the gear system is not required.

It is a further object of our invention to provide an overdrive power transmission system having multiple speed ratio gearing in a hydrokinetic torque converter mechanism wherein provision is made for splitting the delivered torque through a fully mechanical torque delivery path in the system with the balance of the power being distributed hydrokinetically through the system. This results in an increase in converter efficiency as well as an increase in engine efficiency due to the presence of the overdrive speed ratio.

It is a further object of our invention to provide a split torque delivery path in a transmission system having a hydrokinetic torque converter and planetary gearing. We have accomplished this objective without the need for a torque delivery member extending through the region of the torus circuit of the converter mechanism as the mechanical torque delivery path is established.

Further features and objects of our invention will become apparent from the following description and from the accompanying drawings, wherein:

FIGURE 1 shows in schematic form one embodiment of our invention;

FIGURE 2A, 2B and 2C show a cross sectional assembly view of the transmission structure of FIGURE 1 taken along the plane of section line 2B—2B of FIGURE 3;

FIGURE 2D is a chart describing the mode of operation of the structure of FIGURES 1, 2A, 2B and 2C;

FIGURE 3 shows a cross sectional view taken along the plane of section line 3—3 of FIGURE 2B;

FIGURE 4 shows another transmission assembly employing a gear system somewhat similar to the gear system of FIGURE 1 but which has a simple planetary overdrive gear unit instead of a compound, planet pinion, overdrive gear unit as in the embodiment of FIGURE 1. The assembly of FIGURE 4 includes a split torque delivery path between the power input shaft and the elements of the gearing;

FIGURE 4A is a chart describing the mode of operation of the structure of FIGURE 4;

FIGURE 5 is a view somewhat similar to the assembly of FIGURE 4 but it does not employ a split torque delivery path. All of the torque is distributed hydrokinetically through the system of FIGURE 5;

FIGURE 5A is a chart describing the mode of operation of the structure of FIGURE 5;

FIGURE 6 is a view similar to FIGURE 1 although the torque is distributed entirely hydrokinetically from the engine to the gearing;

FIGURE 6A is a chart describing the mode of operation of the structure of FIGURE 6;

FIGURE 7 shows another transmission assembly employing the overdrive planetary gear system of FIGURE 1 although the two simple planetary gear units of FIGURE 1 have been replaced in the FIGURE 7 embodiment by a compound planetary gear arrangement; and FIGURE 7A is a chart describing the mode of operation of the structure of FIGURE 7.

Figure 2A:
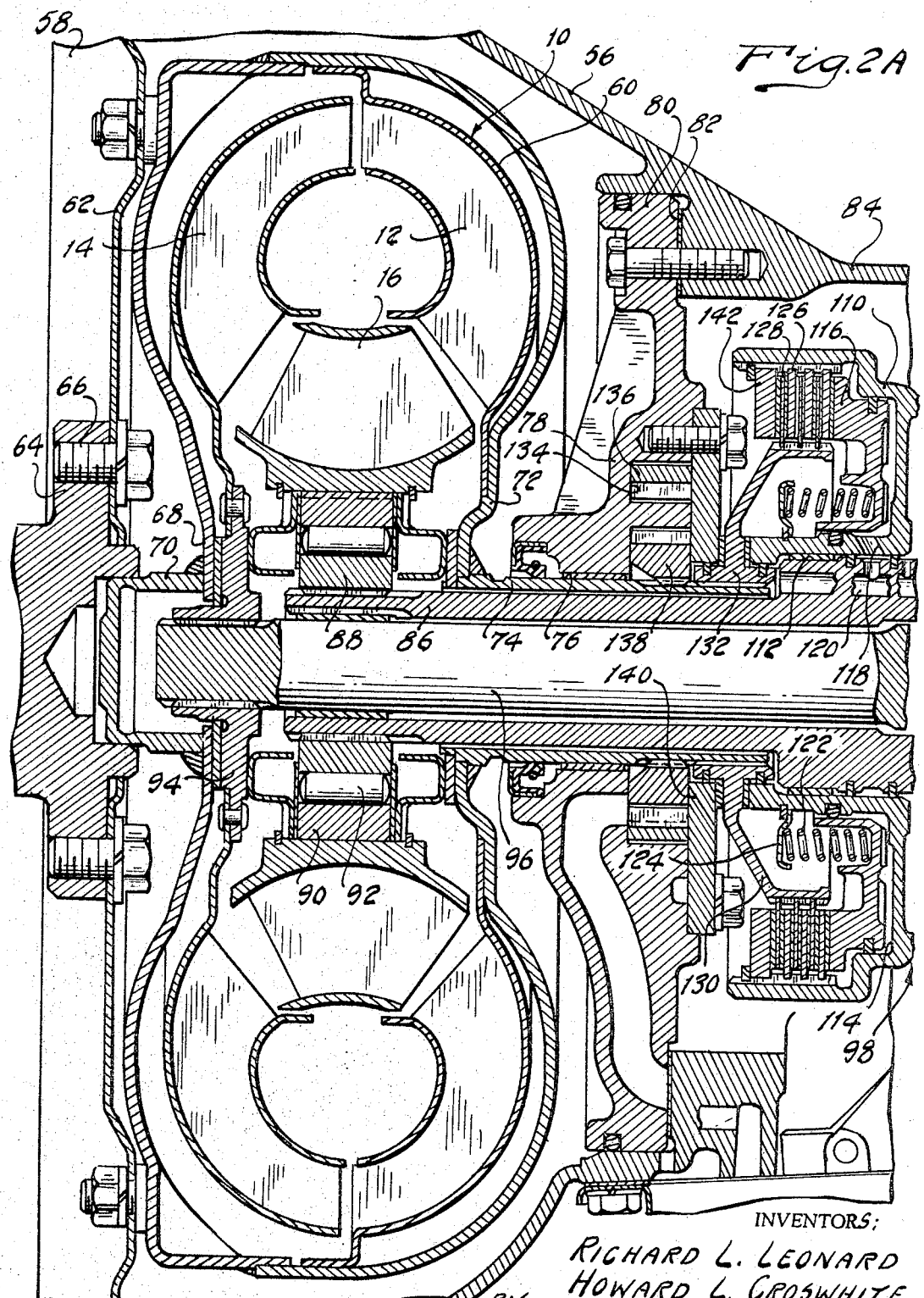

In FIGURE 1 numeral 10 designates a hydrokinetic torque converter mechanism. It includes a hydrokinetic, bladed impeller 12, a bladed turbine 14 and a bladed stator 16. The impeller, the turbine and the stator are situated in toroidal fluid flow relationship in a common torus circuit in the usual fashion.

The planetary gear system of FIGURE 1 includes a first simple planetary gear unit 18 and a second simple planetary gear unit 20. Gear unit 18 includes a ring gear 22, a sun gear 24, a carrier 26 and a planetary pinion 28 journaled rotatably upon the carrier 26. Gear unit 20 includes a ring gear 30, a sun gear 32, a carrier 34 and planetary pinions 36 which are journaled rotatably upon the carrier 34. Carrier 34 is connected to a brake drum 38.

A friction brake is adapted to anchor the drum 38 selectively. In the schematic view of FIGURE 1, the brake is in the form of a brake band 40. In the assembly drawing of FIGURES 2A, 2B and 2C, however, the friction brake is in the form of multiple brake discs 40'. Alternate ones of discs 40' are connected by means of splines to the drum 38. The other discs 40' are secured to the transmission housing 42 by means of a splined connection identified in FIGURE 2C at 44.

The housing 42 includes an end wall 46 which defines an annular cylinder 48 within which is positioned an annular piston 50. As the pressure chamber defined by the cylinder 48 and the piston 50 is pressurized, the piston 50 engages the discs 40' thereby anchoring the drum 38.

An overrunning brake shown at 52 cooperates with the friction brake for the drum 38 to inhibit rotation of the drum 38 in one direction although it is capable of accommodating freewheeling motion in the other direction.

Ring gear 30 is connected directly to power output shaft 54. Also carrier 26 of the planetary gear unit 18 is connected drivably to the shaft 54.

As seen in FIGURE 2A, housing 42 includes a converter bell housing portion 56. Its periphery 58 may be bolted or otherwise secured to the engine block in an internal combustion engine. Housing portion 56 encloses a converter impeller shell 60 which is connected by means of a driveplate 62 to the flanged end 64 of an internal combustion engine crankshaft, suitable bolts 66 being provided for this purpose. Impeller hub portion 68 has secured thereto a pilot 70 which is received within a pilot opening formed in the end of the crankshaft. Another hub portion 72 for the impeller is secured by welding to sleeve shaft 74, which is journaled by means of a bushing 76 within an opening formed in a transverse support wall 78. This wall is secured at its periphery 80 to shoulder 82 located at the juncture of housing portion 56 and main housing portion 84 for the transmission housing 42.

Stator 16 is mounted upon and supported by a stator sleeve shaft 86 which extends through sleeve shaft 74. The inner race 88 of an overrunning brake for the stator 16 is splined to shaft 86. The brake includes a cammed outer race 90 and rollers 92 situated between the races so that they are capable of engaging the cammed recesses of race 90.

The turbine 14 includes a hub 94 which is splined to a turbine shaft 96.

An overdrive gear unit 98 is located between the torque converter 10 and the gear unit 18. It includes a ring gear 100, a sun gear 102, a carrier shown in part at 104, planet pinion shafts 106 carried by the carrier 104 and planet pinions 108 journaled rotatably upon shafts 106 so that they mesh with sun gear 102. Pinions 108 mesh with other pinions 110 which also are journaled by means of pinion shafts on the carrier 104. Pinions 110 mesh with ring gear 100.

Carrier 104 is connected to and is formed integrally with the shaft 86. A clutch drum 110 is journaled on the extension 86 by means of a bushing 112. Drum 110 defines an annular cylinder 114 within which is positioned an annular piston 116. The cylinder and the piston cooperate to define a pressure chamber that is in fluid communication through a port 118 with a clutch pressure feed passage 120 formed in the stator support sleeve shaft 86. A piston return spring 122 is situated between the piston 116 and a spring seat 124 which is held on the hub of drum 110 by means of a snap ring.

The periphery of the drum 110 is internally splined to permit a splined connection with externally splined friction discs 126. These are situated in interdigital relationship with respect to internally splined clutch discs 128 carried by an externally splined clutch member 130. This member 130 is splined at its hub 132 to the sleeve shaft 74.

The wall 78 through which sleeve shaft 74 extends is formed with a pump cavity 134. Positive displacement pump gears 136 and 138 are positioned in the cavity 134. The cavity is closed by a closure plate 140. The pump shown in part at 134 and 136, which is driven by the vehicle engine, functions as a fluid pressure source for the various transmission clutches and brakes.

The ring gear 100 is connected to or is formed integrally with the drum 110. Thus it rotates in unison with the drum 110 and is clutched to the sleeve shaft 74 whenever the friction disc clutch assembly shown in part at 126 and 128 is applied. The clutch becomes applied whenever pressure is admitted to the annular cylinder 114. A clutch pressure back-up plate 142 is carried by the drum 110 and is held axially fast by a snap ring.

A stationary sleeve 144 surrounds shaft 96. Located between shaft 144 and shaft 96 is a sleeve shaft 146 which is splined to sun gear 102. A drum 148 is journaled on the extension 144 by means of a bushing 150. Another bushing 152 located at a relatively large diameter portion of the sleeve 144 also functions to journal the drum 148.

Drum 148 is formed with an annular cylinder 154 which receives an annular piston 156 and cooperates therewith to define a pressure cavity. This cavity is in fluid communication through a pressure feed passage 158 with a pressurized fluid pressure supply passage 160. A piston return spring 162 is situated between the piston 156 and the spring seat 164, which is held on the hub of drum 148 by means of a snap ring.

A friction brake band 166 surrounds the drum 148. The interior periphery of the drum 148 is splined to permit a driving connection with externally splined friction clutch discs 168. These are situated in interdigital relationship with respect to internally splined clutch discs 170 carried by an externally splined clutch member 172. This member 172 forms an outer race for an overrunning clutch 174 which has a cylindrical inner race 176 and rollers 178 situated between the race 176 and the race 172.

Sleeve shaft 146 is keyed at 182 to the hub of drum 148.

Inner race 176 is bolted to clutch drum 182. This drum is formed with a hub 184 which is splined to shaft 96. Drum 182 is formed with an annular cylinder 186 which receives an annular piston 188. This piston is adapted to engage a Belleville spring operator 190, which is connected at its outer periphery to the inner periphery of the drum 182. The inner peripheral margin of the spring operator 190 is engaged by the piston 188 and an intermediate section of the spring 190 engages a clutch pressure plate 192. This pressure plate is situated directly adjacent cooperating internally splined friction discs 194 and externally splined friction discs 196. A clutch pressure reaction plate 198 is carried by the inner periphery of the drum 182 and is held axially fast by a snap ring.

Figure 2B:
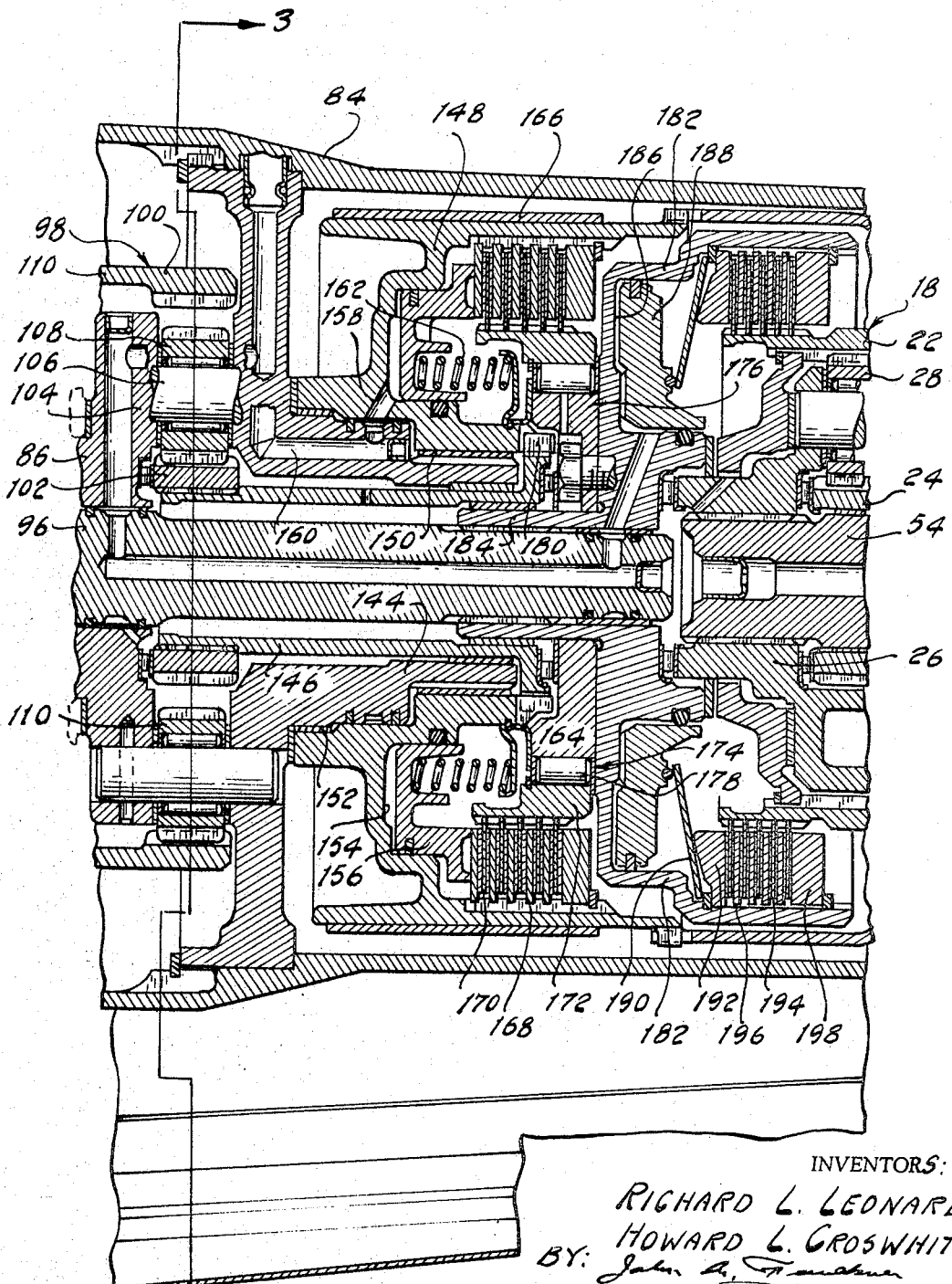

To simplify the description of the operation of the structure of FIGURES 2A, 2B and 2C, the clutch disc assembly shown in part at 126 and 128 is identified in FIGURES 1 and 2D as clutch CL-1. The brake 40 or 40' is identified in FIGURE 2D as brake B-2. The brake 166 is identified as brake B-1. The clutch disc assembly shown in part at 196 and 198 is identified as clutch CL-3. The overrunning clutch 174 is identified as clutch CL-4 and the overruning clutch 52 is identified as clutch C-5. This same nomenclature will be used also with reference to the other embodiments to be described subsequently.

If low speed ratio operation in the manual low range is desired, brake B-2 is applied and clutch CL-3 is engaged. Reaction torque is accommodated by the overrunning brake C-5 as it complements the action of brake B-2, the latter permitting the gearing to transfer braking torque from shaft 54 to the engine during coasting. During normal operation in the low speed ratio, brake band B-2 is released. Only clutch CL-3 is applied. Brake C-5 is capable of distributing reaction torque of the carrier 34 to the transmission housing. Driven torque is delivered from shaft 96 to the ring gear 22. The resistance to rotation offered by the carrier 26 causes sun gear 24 to rotate in a direction opposite to the direction of rotation of the shaft 96. A positive driving torque, however, is exerted upon the carrier 26 and hence upon the shaft 54.

Since sun gear 32 rotates in unison with sun gear 24 and since the carrier 34 is anchored by the overrunning brake C-5, ring gear 30 tends to be driven in the direction of rotation of the shaft 96. A split torque delivery path then is established through the gearing during low speed ratio operation.

Intermediate speed ratio operation is obtained by engaging the sun gear brake B-1 while clutch CL-3 remains applied. The sun gear 24 thus acts as a reaction point and the carrier 26 is driven at an increased speed relative to the speed of shaft 96. Gear unit 20 does not form a part of the torque delivery path during intermediate speed ratio operation. Overrunning brake C-5 freewheels.

High speed ratio direct drive operation is achieved by engaging simultaneously clutches CL-2 and CL-3. This causes the elements of the gearing to rotate in unison. Brakes B-1 and B-2 are released.

An upshift from the direct drive, high speed ratio to an overdrive ratio is obtained by engaging clutch CL-1, and as clutches CL-2 and CL-3 remain applied clutch CL-1 establishes a mechanical connection between the engine crankshaft and the ring gear 100 of the overdrive planetary gear unit 98. The carrier of the compound planetary pinions is anchored. Thus the sun gear 102 of the planetary gear unit 98 tends to overspeed the ring gear 100. The hydrokinetic torque converter establishes a hydrokinetic torque delivery path that is in parallel relationship with respect to the mechanical torque delivery path through the overdrive gearing. This hydrokinetic torque delivery path causes ring gear 22 of gear unit 18 to be driven at the speed of sun gear 24 of gear unit 18. It is greater than the speed of ring gear 22. This differential motion can be accommodated by the overrunning clutch C-4. Thus a speed ratio change from the high speed direct drive ratio to the overdrive ratio is achieved simply by engaging clutch CL-1. Clutch C-4 allows a pickup shift to occur.

An overdrive ratio can be achieved in the transmission system of FIGURES 1 and 2 without the use of the clutch C-4. It would be necessary, however, to sequentially disengage clutch CL-2 and engage clutch CL-1 during a shift to the overdrive ratio as clutch C-4 overruns.

Reverse drive is accomplished by engaging brake B-2 and clutch CL-2 and by releasing brake B-1, clutch CL-1 and clutch CL-3. Turbine torque then is delivered through clutch C-4 and through clutch CL-2 to the sun gear 32. Turbine torque then drives sun gear 32. But since carrier 34 is anchored by the brake B-2, the ring gear 30 and the power output shaft 54 are driven in a reverse direction.

In FIGURE 4 we have illustrated an alternate transmission system employing an overdrive gear unit with simple planetary pinions rather than double or compound planetary pinions. The elements of the gear system of FIGURE 4, which are shown in schematic form, have counterpart elements in the embodiment of FIGURES 1 and 2. For this reason similar reference characters have been used although primed notations have been added.

In FIGURE 4 the overdrive planetary gear unit shown at 98′ has its ring gear 100′ anchored directly against the transmission housing. It thus serves as a reaction member. The sun gear 102′, like the sun gear 102 of the embodiment of FIGURES 1 and 2, is connected to the common sun gears of the planetary gear system. The clutch CL-1′, instead of connecting the converter impeller to the ring gear 100′, connects it to the carrier for the planetary gear unit 98′. This allows the sun gear 102′ as well as the common sun gear 24′ and 32′ to rotate faster than the speed of rotation of the ring gear 22′ and the shaft 96′.

In the arrangement shown in FIGURE 4, a direct mechanical connection between the torque input side of the clutch CL-1′ and the crankshaft of the engine is defined in part by a torque transfer member 200 which extends through the eye of the torus for the hydrokinetic torque converter mechanism 10′ and through the space between the flow exit section of the turbine 14′ and the flow entrance section of the bladed stator 16′. Member 200 is connected to a sleeve shaft 202 which extends through the stationary stator shaft 86′.

The mode of operation of the structure of FIGURE 4 is apparent from an inspection of the chart of FIGURE 4A. Both the structure of FIGURE 4 and the structures of FIGURES 1, 2A, 2B and 2C are substantially similar in function. The FIGURES 1, 2A, 2B and 2C embodiment, however, does not require the use of a torque transfer member that extends through the fluid flow passages of the torus circuit for the torque converter. In this respect the embodiment of FIGURES 1, 2A, 2B and 2C may have some preference. On the other hand, the embodiment of FIGURES 1, 2A, 2B and 2C requires the use of double planetary pinions whereas a simple planetary gear unit can be used in the FIGURE 4 construction to obtain the over-drive ratio.

In the construction of FIGURE 5 the elements of the gearing are arranged in a manner substantially similar to the arrangement of the elements of the structure of FIGURE 4. The torque delivery path, however, is entirely hydrokinetic in the FIGURE 5 embodiment whereas a split torque delivery path is provided in the overdrive range in the FIGURE 4 construction. The torque input element of the clutch CL-1$^2$ of the FIGURE 5 embodiment is connected directly to the turbine shaft 96$^2$ rather than to the impeller 12$^2$. In other respects the FIGURE 5 construction is the same as the FIGURE 4 construction. Its mode of operation is the same, as will be observed by comparing FIGURES 4A and 5A.

The elements of the FIGURE 5 construction that have counterpart elements in the FIGURE 4 construction have been identified by similar reference characters although the superscript notation ($^2$) has been added. FIGURE 5A charts the operating sequence of the clutches and brakes during the various speed ratio changes for the FIGURE 5 construction.

The FIGURE 6 construction is similar to the construction of FIGURES 1 and 2, but it does not include a split torque delivery path during overdrive operation. The torque input element of the clutch CL-1$^3$ in the FIGURE 6 construction is connected directly to the turbine shaft 96$^3$ rather than to the impeller. Thus when the clutch CL-1$^3$ is applied, a hydrokinetic torque delivery path is established between the engine crankshaft and the ring gear 100$^3$. The chart of FIGURE 6A sets forth the sequence of operation of the clutches and brakes of the FIGURE 6 construction as speed ratio changes are made.

In FIGURE 7 we have illustrated a transmission system having an overdrive speed ratio and compound planetary gearing rather than the tandem simple planetary gear units of the other constructions. The FIGURE 7 construction is somewhat similar to the construction of FIGURES 1, 2A, 2B and 2C with respect to the overdrive ratio. That is, the torque delivery path that is established through the gear system during overdrive operation is partly mechanical and partly hydrokinetic. The overdrive ratio is accomplished by using an overdrive gear unit having double planetary pinions.

In FIGURE 7 numeral 204 designates a hydrokinetic torque converter and numeral 206 designates generally a compound planetary gear unit. Converter 204 includes a bladed impeller 208, a bladed turbine 210 and a bladed stator 212. These bladed elements of the converter are arranged in toroidal fluid flow relationship in the usual fashion. The stator 212 is mounted upon a stationary sleeve shaft 214. An overrunning brake 216 anchors the stator 212 against the sleeve 214 to inhibit rotation of the stator 212 in a direction opposite to the direction of rotation of the impeller, although freewheeling motion of the stator in the other direction is permitted during coupling operation.

An overdrive gear unit 218 is situated between the converter 204 and the gear unit 206. It includes a ring gear 220, a sun gear 222 and double planetary pinions 224 and 226. Pinions 224 and 226 are journaled rotatably upon carrier 228 which in turn is fixed to the transmission housing 230.

A clutch C-1$^4$ is adapted to connect drivably ring gear 220 with impeller 208. During overdrive operation turbine 210 is connected to turbine shaft 232. This shaft in turn is connected to the inner race of an overrunning clutch C-4$^4$. A selectively engageable friction clutch C-2$^4$ is used for selectively connecting shaft 232 with sun gear shaft 234. Sun gear 222 of the overdrive gear unit 218 is connected directly to a second sun gear shaft 236. This connection is established by a torque transfer drum 238 about which is positioned a selectively engageable friction brake B-1$^4$.

A selectively engageable friction clutch C–3⁴ connects the outer race of clutch C–4⁴ to the drum 238.

The compound planetary gear unit 206 includes a ring gear 240, a small pitch diameter sun gear 242, a large pitch diameter sun gear 244, a set of long planetary pinions 246 and a set of short planetary pinions 248. Sun gear 242 is connected to sun gear shaft 234 and sun gear 244 is connected to sun gear shaft 236. The pinions 246 mesh with pinions 248 the latter engaging sun gear 242 and the former engaging ring gear 240 and sun gear 244.

Pinions 246 and 248 are journaled rotatably upon a common carrier 250. Selectively engageable friction brake B–2⁴ cooperates with the carrier 250 to selectively anchor it thereby allowing the carrier to act as a reaction point for the gear system. Carrier 248 is adapted to be anchored against rotation in one direction by overrunning brake C–5⁴.

The sequence for the engagement and release of the various clutches and brakes in the system of FIGURE 7 is illustrated in the chart of FIGURE 7A.

Having thus described preferred forms of our invention, what we claim and desire to secure by U.S. Letters Patent is:

1. A multiple speed ratio power transmission system comprising a hydrokinetic torque converter mechanism and planetary gearing adapted to establish plural torque delivery paths between a driving member and a driven member, said converter including an impeller, a turbine and a stator situated in toroidal fluid flow relationship with the impeller connected to said driving member, first reaction brake means for anchoring one element of said planetary gearing to establish a reaction point during low speed ratio operation, selectively engageable clutch means for connecting said turbine to a first power input element of said gearing during operation of said mechanism in each forward driving speed ratio, second selectively engageable brake means for anchoring a second element of said gearing to establish a reaction point during operation in an intermediate speed ratio, second selectively engageable clutch means for connecting said turbine to said second element when said second brake means is released to establish high speed ratio direct drive operation, an overdrive planetary gear unit having a reaction member connected to a stationary portion of said system and a power output member connected to said second element of said gearing, and means for delivering driving torque to a power input element of said overdrive gear unit from said driving member.

2. A multiple speed ratio power transmission system comprising a hydrokinetic torque converter and speed reducing planetary gearing capable of establishing plural torque delivery paths between a driving member and a driven member, said converter comprising an impeller, a turbine and a stator situated in toroidal fluid flow relationship with the impeller being connected to said driving member, first brake means for anchoring a first reaction element of said gearing during low speed ratio operation, selectively engageable clutch means for connecting said turbine to a power input element of said gearing during operation in each forward drive speed ratio, second brake means for anchoring a second element of said gearing during intermediate speed ratio operation, second selectively engageable clutch means for connecting said turbine to said second element of said gearing when said second brake means is released to establish high speed ratio operation, an overdrive gear unit comprising planetary gear elements, one of said gear elements being connected to a stationary portion of said system to provide a reaction point, and a selectively engageable overdrive clutch means for connecting a second of said overdrive gearing elements to said impeller, a third of said elements of said overdrive gear unit being connected to said second element of said gearing whereby a split torque delivery path through said gearing is established during overdrive operation.

3. A multiple speed ratio power transmission system comprising a hydrokinetic torque converter mechanism and planetary gearing adapted to establish plural torque delivery paths between a driving member and a driven member, said converter including an impeller, a turbine and a stator situated in toroidal fluid flow relationship with the impeller connected to said driving member, first reaction brake means for anchoring one element of said planetary gearing to establish a reaction point during low speed ratio operation, selectively engageable clutch means for connecting said turbine to a first power input element of said gearing during operation of said mechanism in each forward driving speed ratio, second selectively engageable brake means for anchoring a second element of said gearing to establish a reaction point during operation in an intermediate speed ratio, second selectively engageable clutch means for connecting said turbine to said second element when said second brake means is released to establish high speed ratio direct drive operation, an overdrive planetary gear unit having a reaction member connected to a stationary portion of said system and a power output member connected to said second element, means for delivering driving torque to a power input element of said overdrive gear unit from said driving member, said second selectively engageable clutch means comprising a torque input element, a turbine shaft connected to said turbine, and one-way clutch means situated between said turbine shaft and said torque input element whereby said selectively engageable clutch means is rendered ineffective for torque delivery when said overdrive clutch means is applied.

4. A multiple speed ratio power transmission system comprising a hydrokinetic torque converter and speed reducing planetary gearing capable of establishing plural torque delivery paths between a driving member and a driven member, said converter comprising an impeller, a turbine and a stator situated in toroidal fluid flow relationship with the impeller being connected to said driving member, first brake means for anchoring a first reaction element of said gearing during low speed ratio operation, selectively engageable clutch means for connecting said turbine to a power input element of said gearing during operation in each forward drive speed ratio, second brake means for anchoring a second element of said gearing during intermediate speed ratio operation, second selectively engageable clutch means for connecting said turbine to said second element of said gearing when said second brake means is released to establish high speed ratio operation, an overdrive gear unit comprising planetary gear elements, one of said gear elements being connected to a stationary portion of said system to provide a reaction point, a selectively engageable overdrive clutch means for connecting a second of said overdrive gear elements to said impeller, a third of said elements of said overdrive gear elements being connected to said second element of said gearing whereby a split torque delivery path through said gearing is established during overdrive operation, said second selectively engageable clutch means comprising a torque input element, a turbine shaft connected to said turbine, and one-way clutch means situated between said turbine shaft and said torque input element whereby said selectively engageable clutch means is rendered ineffective for torque delivery when said overdrive clutch means is applied.

5. A multiple speed ratio power transmission system comprising a hydrokinetic torque converter mechanism and planetary gearing adapted to establish pural torque delivery paths between a driving member and a driven member, said converter including an impeller, a turbine and a stator situated in toroidal fluid flow relationship with the impeller connected to said driving member, first reaction brake means for anchoring one element of said planetary gearing to establish a reaction point during low speed ratio operation, selectively engageable clutch means for connecting said turbine to a first power input element of said gearing during operation of said mechanism in each forward driving speed ratio, second selectively engageable brake means for anchoring a second element of said gearing to establish a reaction point during operation in an intermediate speed ratio, second selectively engageable clutch means for connecting said turbine to said second element when said second brake means is released to establish high speed ratio direct drive operation, an overdrive planetary gear unit having a reaction member connected to a stationary portion of said system, a power output member connected to said second element, and means for delivering driving torque from a power input element of said overdrive gear unit from said driving member, said overdrive gear unit being situated between said hydrokinetic unit and said gearing in a composite assembly, and a common transmission housing enclosing said hydrokinetic unit, said gearing and said overdrive gear unit.

6. A multiple speed ratio power transmission system comprising a hydrokinetic torque converter and speed reducing planetary gearing capable of establishing plural torque delivery paths between a driving member and a driven member, said converter comprising an impeller, a turbine and a stator situated in toroidal fluid flow relationship with the impeller being connected to said driving member, first brake means for anchoring a first reaction element of said gearing during lower speed ratio operation, selectively engageable clutch means for connecting said turbine to a power input element of said gearing during operation in each forward drive speed ratio, second brake means for anchoring a second element of said gearing during intermediate speed ratio operation, second selectively engageable clutch means for connecting said turbine to said second element of said gearing when said second brake means is released to establish high speed ratio operation, an overdrive gear unit comprising planetary gear elements, one of said elements being connected to a stationary portion of said system to provide a reaction point, a selectively engageable overdrive clutch means for connecting a second of said overdrive gearing elements to said impeller, a third of said elements of said overdrive gear unit being connected to said second element of said gearing whereby a split torque delivery path through said gearing is established during overdrive operation, said overdrive gearing being situated between said hydrokinetic unit and said gearing in a composite assembly and a common transmission housing enclosing said hydrokinetic unit, said gearing and said overdrive gear unit.

7. A multiple speed ratio power transmission system comprising a hydrokinetic torque converter mechanism and planetary gearing adapted to establish plural torque delivery paths between a driving member and a driven member, said converter including an impeller, a turbine and a stator situated in toroidal fluid flow relationship, said impeller being connected to said driving member, first reaction brake means for anchoring one element of said planetary gearing to establish a reaction point during low speed ratio operation, selectively engageable clutch means for connecting said turbine to a first power input element of said gearing during operation of said mechanism in each forward driving speed ratio, second selectively engageable brake means for anchoring a second element of said gearing to establish a reaction point during operation in intermediate speed ratio, second selectively engageable clutch means for connecting said turbine to said second element when said second brake means is released to establish high speed ratio direct drive operation, an overdrive planetary gear unit having a reaction member connected to a stationary portion of said system and a power output member connected to said second element of said gearing, overdrive clutch means for delivering driving torque to a power input element of said overdrive gear unit from said driving member, said second selectively engageable clutch means comprising a torque input element, a turbine shaft connected to said turbine, and one-way clutch means situated between said turbine shaft and said torque input element whereby said second selectively engageable clutch means is rendered ineffective for torque delivery when said overdrive clutch means is applied, said overdrive gear unit being situated between said hydrokinetic unit and said gearing in a composite assembly, and a common transmission housing enclosing said hydrokinetic unit, said gearing and said overdrive gear unit.

8. A multiple speed ratio power transmission system comprising a hydrokinetic torque converter and speed reducing planetary gearing capable of establishing plural torque delivery paths between a driving member and a driven member, said converter comprising an impeller, a turbine and a stator situated in toroidal fluid flow relationship with the impeller being connected to said driving member, first brake means for anchoring a first reaction element of said gearing during low speed ratio operation, selectively engageable clutch means for connecting said turbine to a power input element of said gearing during operation in each forward drive speed ratio, second brake means for anchoring a second element of said gearing during intermediate speed ratio operation, second selectively engageable clutch means for connecting said turbine to said second element of said gearing when said second brake means is released to establish high speed ratio operation, an overdrive gear unit comprising planetary gear elements, one of said elements being connected to a stationary portion of said system to provide a reaction point, a selectively engageable overdrive clutch means for connecting a second of said overdrive gearing elements to said impeller, a third of said elements of said overdrive gear unit being connected to said second element, whereby a split torque delivery path through said gearing is established during overdrive operation, said second selectively engageable clutch means comprising a torque input element, a turbine shaft connected to said turbine, and one-way clutch means situated between said turbine shaft and said torque input element whereby said selectively engageable clutch means is rendered ineffective for torque delivery when said overdrive clutch means is applied, said overdrive gear unit being situated between said hydrokinetic unit and said gearing in a composite assembly and a common transmission housing enclosing said hydrokinetic unit, said gearing and said overdrive gear unit.

9. A multiple speed ratio power transmission system comprising a hydrokinetic torque converter mechanism and planetary gearing adapted to establish plural torque delivery paths between a driving member and a driven member, said converter including an impeller, a turbine and a stator situated in toroidal fluid flow relationship, said impeller being connected to said driving member, first reaction brake means for anchoring one element of said planetary gearing to establish a reaction point during low speed ratio operation, selectively engageable clutch means for connecting said turbine to a first power input element of said gearing during operation of said mechanism in each forward driving speed ratio, second selectively engageable brake means for anchoring a second element of said gearing to establish a reaction point during operation in intermediate speed ratio, second selectively engageable clutch means for connecting said turbine to said second element when said second brake means is released to establish high speed ratio direct drive operation, and an overdrive planetary gear unit having a reaction member connected to a stationary portion of said system a power output member connected to said second element of said gearing, and third selectively engageable clutch means for delivering driving torque to a power input element of said overdrive gear unit from said driving member, said overdrive gear unit being situated between said hyrokinetic unit and said gearing in a composite assembly, said overdrive gear unit comprising a ring gear, a sun gear and two pairs of planetary pinions drivably connecting said sun and ring gears, said pinions being located on a common carrier, said common carrier being anchored to said stationary portion, said third selectively engageable clutch means being disposed between said impeller and said overdrive ring gear, said overdrive sun gear being connected to said second element of said gearing.

10. A multiple speed ratio power transmission system comprising a hydrokinetic torque converter and speed reducing planetary gearing capable of establishing plural torque delivery paths between a driving member and a driven member, said converter comprising an impeller, a turbine and a stator situated in toroidal fluid flow relationship with the impeller being connected to said driving member, first brake means for anchoring a first reaction element of said gearing during low speed ratio operation, first selectively engageable clutch means for connecting said turbine to a power input element of said gearing during operation in each forward drive speed ratio, second brake means for anchoring a second element of said gearing during intermediate speed ratio operation, second selectively engageable clutch means for connecting said turbine to said second element of said gearing when said second brake means is released to establish high speed ratio operation, an overdrive gear unit comprising planetary gear elements, one of said elements being connected to a stationary portion of said system to provide a reaction point, a selectively engageable overdrive clutch means for connecting a second of said overdrive gear elements to said impeller, a third of said elements of said overdrive gear unit being connected to said second element of said gearing whereby a split torque delivery path through said gearing is established during overdrive operation, said overdrive gear unit being situated between said hydrokinetic unit and said gearing in a composite assembly within a common transmission housing, said overdrive gear unit comprising a ring gear, a sun gear and two pairs of planetary pinions drivably connecting said sun and ring gears, said pinions being located on a common carrier, said common carrier being anchored to said housing, said overdrive clutch means being disposed between said impeller and said overdrive ring gear, said overdrive sun gear being connected to said second element of said gearing.

11. A multiple speed ratio power transmission system comprising a hydrokinetic torque converter mechanism and planetary gearing adapted to estabilsh plural torque delivery paths between a driving member and a driven member, said converter including an impeller, a turbine and a stator situated in toroidal fluid flow relationship, said impeller being connected to said driving member, first reaction brake means for anchoring one element of said planetary gearing to establish a reaction point during low speed ratio operation, selectively engageable clutch means for connecting said turbine to a first power input element of said gearing during operation of said mechanism in each forward driving speed ratio, second selectively engageable brake means for anchoring a second element of said gearing to establish a reaction point during operation in intermediate speed ratio, second selectively engageable clutch means for connecting said turbine to said second element when said second brake means is released to establish high speed ratio direct drive operation, an overdrive planetary gear unit having a reaction member connected to a stationary portion of said system and a power output member connected to said second element of said gearing, third selectively engageable clutch means for delivering driving torque to a power input element of said overdrive gear unit from said driving member, said second selectively engageable clutch means comprising a torque input element, a turbine shaft connected to said turbine, one-way clutch means situated between said turbine shaft and said torque input element whereby said second selectively engageable clutch means is rendered ineffective for torque delivery when said third clutch means is applied, said overdrive gear unit being situated between said hydrokinetic unit and said gearing, said overdrive gear unit comprising a ring gear, a sun gear and two pairs of planetary pinions drivably connecting said sun and ring gears, said pinions being located on a common carrier, said common carrier being anchored to stationary portion, said third selectively engageable clutch means being disposed between said impeller and said overdrive ring gear, said overdrive sun gear being connected to said second reaction element.

12. A multiple speed ratio power transmission system comprising a hydrokinetic torque converter and speed reducing planetary gearing capable of establishing plural torque delivery paths between a driving member and a driven member, said converter comprising an impeller, a turbine and a stator situated in toroidal fluid flow relationship with the impeller being connected to said driving member, first brake means for anchoring a first reaction element of said gearing during low speed ratio operation, selectively engageable clutch means for connecting said turbine to a power input element of said gearing during operation in each forward drive speed ratio, second brake means for anchoring a second element of said gearing during intermediate speed ratio operation, second selectively engageable clutch means for connecting said turbine to said second element of said gearing when said second brake means is released to establish high speed ratio operation, an overdrive gear unit comprising planetary gear elements, one of said elements being connected to a stationary portion of said system to provide a reaction point, a selectively engageable overdrive clutch means for connecting a second of said overdrive gearing elements to said impeller, a third of said elements of said overdrive gear unit being connected to said second element of said gearing whereby a split torque delivery path through said gearing is established during overdrive operation, said second selectively engageable clutch means comprising a torque input element, a turbine shaft connected to said turbine, and one-way clutch means situated between said turbine shaft and said torque input element whereby said selectively engageable clutch means is rendered ineffective for torque delivery when said overdrive clutch means is applied, said overdrive gear unit being situated between said hydrokinetic unit and said gearing in a composite assembly within a common transmission housing, said overdrive gearing comprising a ring gear, a sun gear and two pairs of planetary pinions drivably connecting said sun and ring gears, said pinions being located on a common carrier, said common carrier being anchored to said housing, said third selectively engageable clutch means being disposed between said impeller and said overdrive ring gear, said overdrive sun gear being connected to said second element of said gearing.

References Cited

UNITED STATES PATENTS

| | | | |
|---|---|---|---|
| 2,395,459 | 2/1946 | Carragua | 74—759 |
| 2,847,877 | 8/1958 | Ravigneaut | 74—759 |
| 3,217,563 | 11/1965 | Simpson | 74—688 |
| 3,267,769 | 8/1966 | Tuck et al. | 74—759 |
| 3,296,891 | 1/1967 | Tuck | 74—688 X |
| 3,300,001 | 1/1967 | Stockton | 74—763 X |

DONLEY J. STOCKING, *Primary Examiner.*

T. C. PERRY, *Assistant Examiner.*